United States Patent [19]

Yoshiura

[11] Patent Number: 4,615,611

[45] Date of Patent: Oct. 7, 1986

[54] VARIABLE MAGNIFICATION COPYING MACHINE

[75] Inventor: Shoichiro Yoshiura, Yamatokoriyama, Japan

[73] Assignee: Sharp Kabushiki Kaisha, Osaka, Japan

[21] Appl. No.: 761,522

[22] Filed: Aug. 1, 1985

[30] Foreign Application Priority Data

Aug. 6, 1984 [JP] Japan ................................ 59-166854

[51] Int. Cl.[4] ........................ G03G 15/00; G03B 27/52

[52] U.S. Cl. ........................................ 355/14 R; 355/55

[58] Field of Search ................ 355/14 R, 14 C, 55–59

[56] References Cited

U.S. PATENT DOCUMENTS

| | | | |
|---|---|---|---|
| 4,277,163 | 7/1981 | Ikesue et al. | 355/56 X |
| 4,393,375 | 7/1983 | Sugiura et al. | 355/14 R |
| 4,440,487 | 4/1984 | Miura | 355/14 R |
| 4,442,505 | 4/1984 | Takano | 355/14 R X |
| 4,505,574 | 3/1985 | Kurata et al. | 355/14 R X |
| 4,505,579 | 3/1985 | Furuichi | 355/55 |
| 4,514,080 | 4/1985 | Matsuzawa et al. | 355/55 X |

*Primary Examiner*—Richard A. Wintercorn

*Attorney, Agent, or Firm*—Birch, Stewart, Kolasch and Birch

[57] ABSTRACT

An improved variable magnification copying machine with a function for calculating a conversion magnification from sizes of an original sheet and a transfer paper sheet to be detected or inputted, which is further provided with a function for calculating transfer available range on the transfer paper sheet from margin defining values to be inputted, and capable of controlling a starting timing for supplying the transfer paper sheets in compliance with the margin defining values in a lateral direction.

1 Claim, 6 Drawing Figures

VARIABLE MAGNIFICATION COPYING MACHINE

BACKGROUND OF THE INVENTION

The present invention generally relates to a variable magnification copying machine capable of calculating a conversion magnification from sizes of an original sheet and a transfer paper sheet, and more particularly, to a variable magnification copying machine capable of copying onto transfer paper sheets, with margins being formed therein.

In recent years, copying machines with the function of the variable magnification have been produced due to a tendency toward multifunction thereof, and furthermore, it has been attempted to simplify a copying operation with variable magnifications.

As one of the variable magnification copying machines, for example, Japanese Patent Laid-Open Application Tokkaisho No. 54-92318 discloses the provision of a detecting unit for an original sheet size at the lower portion of an original sheet platform and a unit for detecting or inputting a transfer paper sheet size to be set, and the conversion magnification is calculated by the sizes of the original sheet and the transfer paper sheet to be detected or inputted, to control rotating speeds of an optical system and a photoconductive drum in accordance with the calculation result.

In making copies with magnification converted from the original sheet of irregular size to the transfer paper sheet of regular size by means of said conventional variable magnification copying machine, there has been such a possibility that an image from the original sheet at a basic position on its platform may be copied to one side on the transfer paper sheet. It is hard to read the contents of copies with such images to be put to one side as aforementioned, and the images have a possibility to be hidden under a binder, when the copies are to be bound in a file.

With the intention of arranging the image around the central portion of the transfer paper sheet to remove the inconvenience as described above or arranging it at the desired position according to other purposes, it has been necessary to find out the most suitable position by repeated copies at each time after gradual shifting of the original sheet on its platform.

In the practice as described above, however, since various kinds of erroneous copies occur, with complicated and time consuming copying operations being additionally required, there has been such an inconvenience that the working efficiency of the copying machine is considerably lowered.

Furthermore, in the case of making copies with magnification converted from the original sheet of regular form to the transfer paper sheet of regular form, the margins cannot be formed on the transfer paper sheet due to the constant ratio of a long side length to a short side length in each paper size. Such being the case, for example, for filing the copies after the magnification to transfer paper sheets of B4 size from original sheets of A4 size having images covering the surface, the images are copied on the whole surface of transfer paper sheets of B4 size, and as a result, such disadvantages have occurred as parts of the images being hidden under a binder or being removed when perforated.

SUMMARY OF THE INVENTION

Accordingly, the present invention has been developed with a view to substantially eliminating the above described disadvantages inherent in the conventional copying machine, and has an essential object to provide an improved copying machine which is capable of utilizing the variable magnification copying function effectively, while the working efficiency is raised owing to the simplified copying operation and the shortened time required therefor, by arranging the image at a desired position on the transfer paper sheet.

The present invention is, in short, a variable magnification copying machine comprising an input means for inputting margin defining ranges being formed in the transfer paper sheet and a calculating means for calculating a transfer available range on the transfer paper sheet from numerical values inputted by the preceding means, and also it is so designed as to calculate the conversion magnification by inputting the above calculation result into a calculating means for calculating the conversion magnification as a transfer paper sheet size and to control a starting timing for supplying the transfer paper sheets according to margin defining numerical values in a lateral direction (i.e., a supplying direction for transfer paper sheets).

In the above construction, the present invention permits the margins to be defined in desired ranges around the image on the transfer paper sheet, and consequently, produces such advantages as described so far.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE EMBODIMENTS

Figure 1:
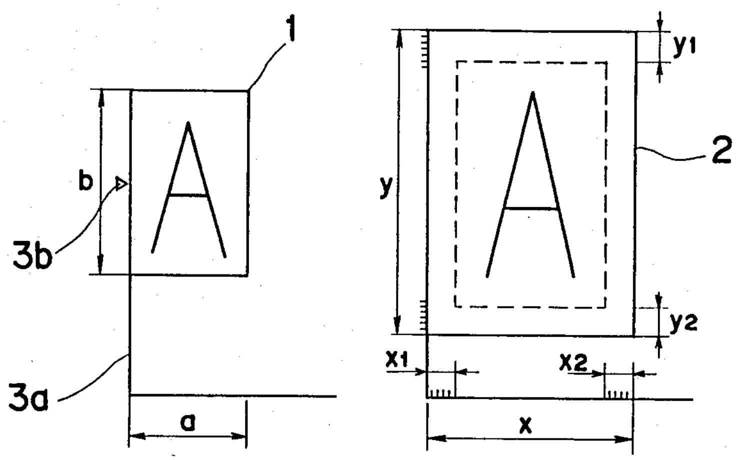
FIG. 1 is a set of diagrams showing a relationship between an original sheet and a transfer paper sheet having its image thereon in the variable magnification copying machine with a margin defining function, to which the present invention is applied.

Before the description of the present invention proceeds, it is to be noted that like parts are designated by like reference numerals throughout the accompanying drawings.

Referring now to the drawings, a variable magnification copying machine according to one preferred embodiment of the present invention will be described hereinafter.

In FIG. 1, there is shown an original sheet which is placed on an original sheet platform 3 in a manner that the center of the original sheet is made to be coincident with a center basic index 3*b* which is a basic position in a direction (referred to as "crosswise direction" hereinafter) perpendicular to a lateral direction on the platform 3 after a left end of the original sheet is lined up at a left side basic position 3*a* in a lateral direction on the platform 3. Then, provided that a lateral side length a and "a" crosswise side length "b" of the original sheet 1 are 150 mm and 200 mm respectively, and corresponding side lengths "x" and "y" of transfer paper sheet of A4 size are 210 mm and 297 mm respectively, and in addition, margin ranges are defined in the lateral direction as a basic direction by setting 20 mm for x1 and 10 mm for x2, the transfer available range in the lateral direction on the transfer paper sheet is 180 mm resulting from $x-(x1+x2)$.

On the other hand, with no margin being ranged in the crosswise direction, the image on the original sheet can be transferred to the transfer paper sheet in a range of crosswise full length y which is equal to 297 mm. Accordingly, ratios of the transfer available range to the size of the original sheet are $180 \div 150 = 1.267$ in the lateral side and $297 \div 200 = 1.485$ in the crosswise side.

Since a selection of the bigger value in both ratios results in the image protruding over the transfer available range in another side, the smaller value, i.e., 1.267 in this case, must be selected as the conversion magnification for the magnification conversion copying after a lens in the copying machine is shifted to a position corresponding to the smaller value. Furthermore, the image on the original sheet 1 can be formed at a desired position on the transfer paper sheet 2 in a manner that a starting timing for supplying the transfer paper sheets is advanced by a period given by dividing x1(20 mm), i.e., the margin range ahead in a direction to which the transfer papers are supplied, by a speed for supplying them. In the case of the original sheet of regular size, the margins to be defined can be arranged around the image on the transfer paper sheets in the same manner as aforementioned. The margins can be also arranged on the basis of y1 and y2 in the crosswise direction, and particularly, it is still possible to make the values of y1 and y2 different by arranging a lens position movable in the crosswise direction.

Figure 2:
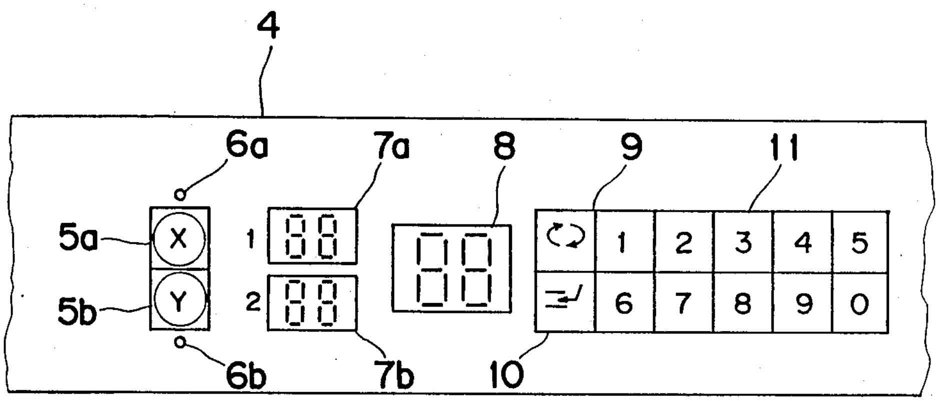
FIG. 2 is a diagram showing a principal portion for operating said copying machine.

Referring to FIG. 2, there is shown a principal operating portion of the copying machine according to the preferred embodiment of the present invention, having tenkeys 11, a repeat key 9 and an interruption key 10 at the right thereof, a display 8 representing the number of copies inputted at the left of the keys, and furthermore, a display and input units at the left of the display 8.

In detail, at the left-most side of FIG. 2, are arranged an x-side margin defining key 5*a* into which the margin is inputted on the basis thereof in the lateral direction as well as a y-side margin defining key 5*b* for inputting the margin in the crosswise direction, and a pair of indicator lamps 6*a* and 6*b* representing which side of the two, x-side and y-side, is defined. A pair of displays 7*a* and 7*b* are arranged to the right of the margin defining keys for representing defined values for the margins inputted by the ten-keys 11. When the margins are being defined in the lateral direction, for example, the indicator lamp 6*a* lights up by depressing x-side margin defining key 5*a,* firstly and an input of desired value for x1 by ten-keys 11 results in a representation thereof on the margin range display 7*a,* secondly and is stored through an operation of numerical value input keys (not shown). The margin definition accomplished after the same operation as mentioned above is carried out with respect to x2.

Figure 3:
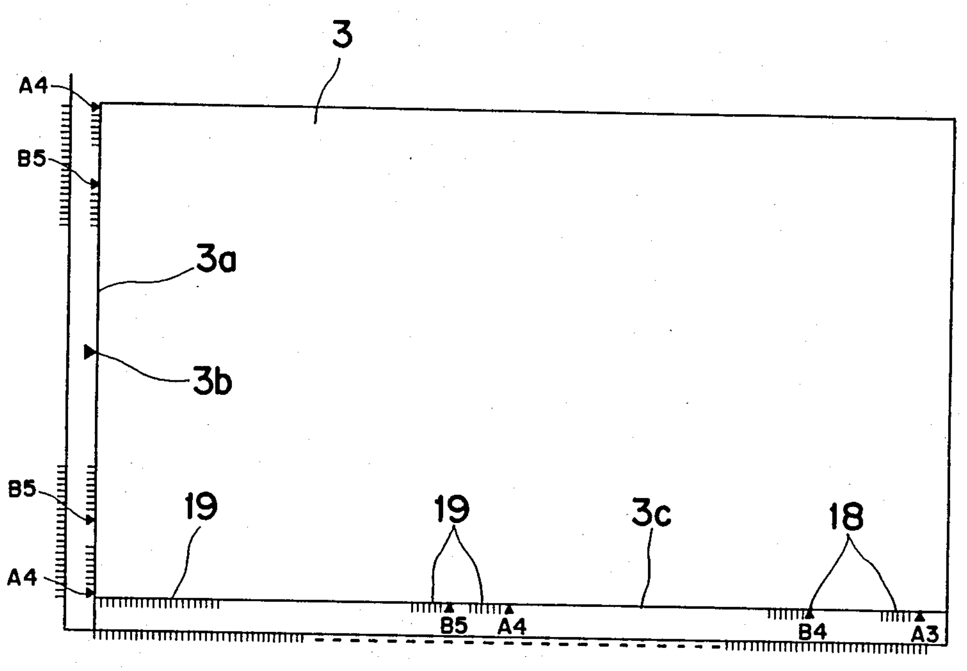
FIG. 3 is a top plan view of the original sheet platform in said copying machine, on which the original sheet is placed for a copying operation.

As shown in FIG. 3, one end 3*a* of the original sheet platform 3 is a basic position in the transfer paper sheet supplying direction when setting the original sheet and the original sheet is positioned, the center thereof in the crosswise direction being made to coincide with a central position index 3*b* which is marked on a central position of end 3*a.* A plurality of paper size indexes 18 are marked on both ends 3*a* and 3*c* of the original sheet platform 3 and a plurality of margin defining indexes 19 which are aimed at when defining margins, are also marked in the vicinity of the indexes 18.

Figure 4:
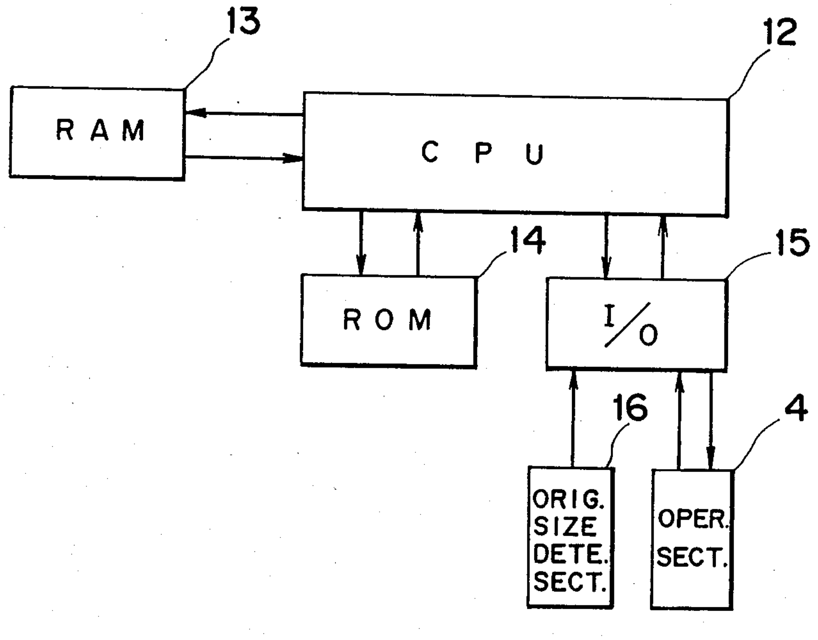
FIG. 4 is a block diagram for said copying machine.

Reference is further made to FIG. 4 showing a block diagram of the variable magnification copying machine with margin a defining function according to the preferred embodiment of the present invention, which includes a CPU (Central Processing Unit) 12 coupled, through an internal bus, to a RAM (Random Access Memory) 13, a ROM (Read Only Memory) 14 and an I/O (Input/Output) interface 15 through which signals from a detecting section 16 for the original sheet size are transmitted to the CPU 12 and signals are exchanged between the CPU 12 and an operating section 4. Further, in the RAM 13 is stored information from I/O unit or calculation results in a calculating circuit and in the ROM 14 are stored programs being provided with the function of the CPU 12 or the crosswise side and the lateral side lengths of regular size papers being applicable to copying machines.

Figure 5:
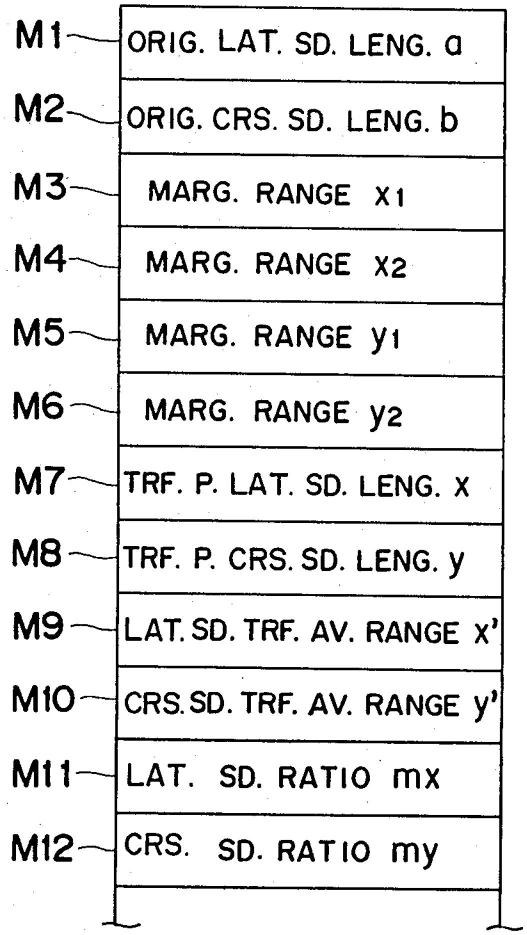
FIG. 5 is a diagram showing a principal portion of memory areas in RAM (Random Access Memory) applied to said copying machine.

In the principal portion of memory areas in RAM 13 as shown in FIG. 5, the original sheet sizes detected by detecting sensors 16 are stored in areas M1, M2 and the margins defining ranges at respective sides in area M3 to area M6, the transfer paper sheet sizes read out from ROM 14 in areas M7, M8, the transfer available ranges given by subtracting the margin ranges from the transfer paper sheet sizes in areas M9, M10 and the ratios of the original sheet sizes to the transfer available ranges in the lateral and crosswise sides are stored in areas M11, M12.

Figure 6:
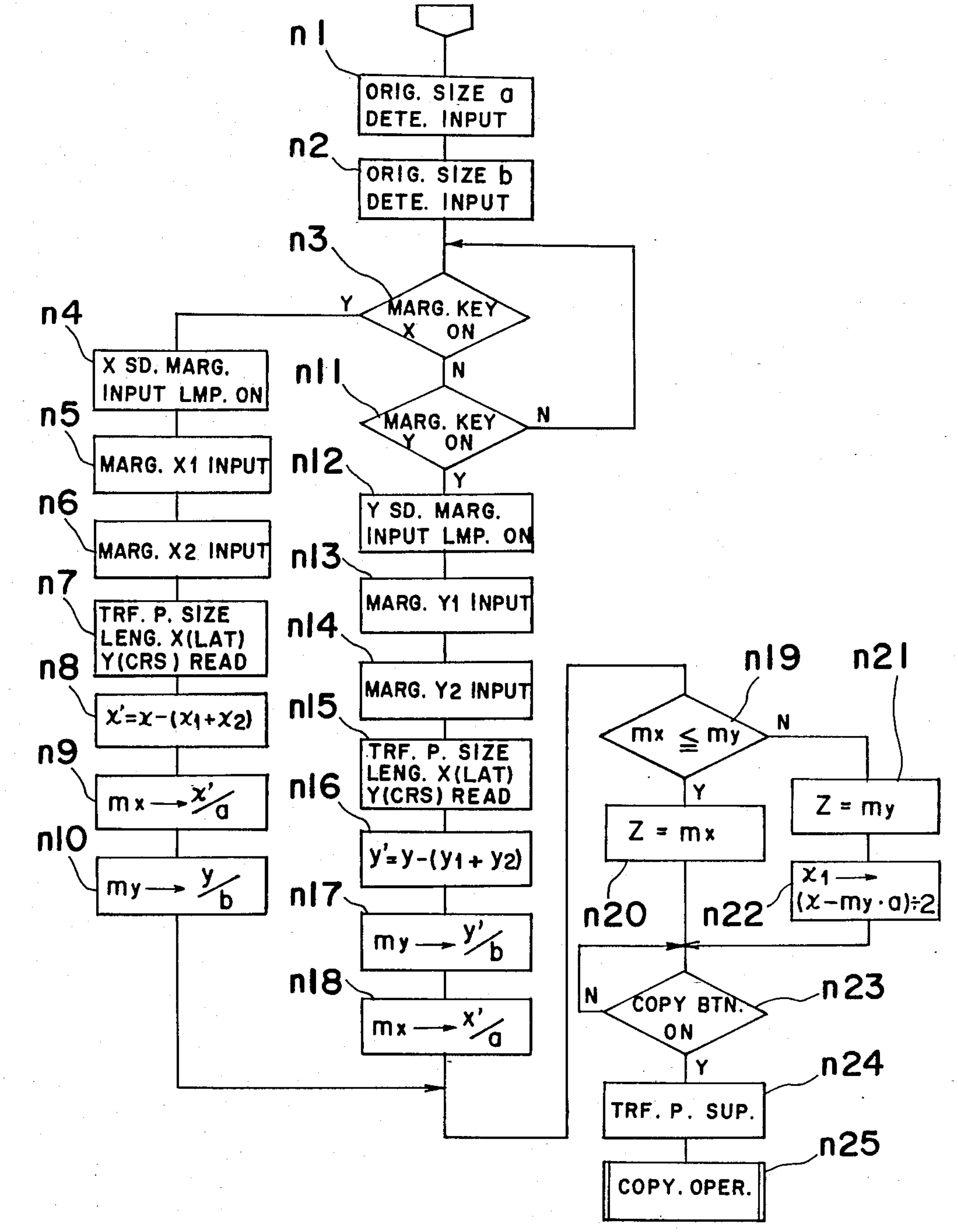
FIG. 6 is a flow chart for explaining the function of said copying machine.

Referring to FIG. 6, there is shown a flow-chart for explaining functions of the variable magnification copying machine with the margin defining function according to the preferred embodiment of the present invention. At steps n1 and n2 in FIG. 6, the lateral side length "a" and the crosswise side length "b" of the original sheet which are detected and inputted, are stored in the areas M1, M2 in RAM 13, respectively.

It is judged whether or not the x-side margin defining key 5*a* is depressed at step n3, and if it is depressed, the procedure proceeding to step n4 results in a lighting of the indicator lamp 6a. At steps n5 and n6, the margin ranges x1, x2 are inputted and stored in the areas M3, M4, respectively, according to the aforementioned procedure. The lateral side length "x" and the crosswise side length "y" of the transfer paper sheet defined are read out from ROM 14 for being stored in the areas M7, M8 in RAM 13, respectively, at step n7. Subsequently, the procedure proceeds to step n8 and the transfer available range in the lateral side of the transfer paper sheet is stored in the area M9 after the calculation thereof.

Thereafter, at step n9, the ratio "mx" in the lateral side lengths of the original sheet to the transfer available range on the transfer paper sheet is calculated from the numerical values in the areas M1 and M9, and stored in the area M11. On the other hand, the ratio "my" in the crosswise side lengths of the original sheet to the transfer paper sheet is calculated for being stored in the area M12 at step n10, and then, the procedure proceeds to step n19.

At step n3, if the x-side margin defining key 5*a* is not depressed, the procedure proceeds to step n11, whereat it is judged whether or not the y-side margin defining key 5*b* is depressed, and if it is not depressed, the procedure returns to step n3. The case wherein key 5*b* is depressed at step n11 results in a lighting of the indicator lamp 6*b*.

At steps n13 and n14, the margin ranges y1, y2 are inputted and stored in the areas M5, M6, respectively. The lateral side length "x" and the crosswise side length "y" of the transfer paper sheet are read out from ROM 14 for being stored in the areas M7, M8 in RAM 13, respectively, at step n15. Subsequently, the transfer available range in the crosswise side of transfer paper sheet is stored in the area M10 after the calculation thereof at step n16.

Thereafter, at step n17, the ratio "my" in the crosswise side lengths of the original sheet to the transfer available range on the transfer paper sheet is calculated from the numerical values in the areas M2 and M10, and stored in the area M12. On the other hand, the ratio "mx" in the lateral side lengths of the original sheet to the transfer paper sheet is calculated for being stored in the area M1 at step n18, and then, the procedure proceeds to step n19.

The ratio "mx" in the lateral sides and the ratio "my" in the crosswise sides stored in the areas M11, M12, respectively are compared at steps n19, and the smaller one is made the conversion magnification Z to shift a lens position according to the magnification at step n20 or n21. In case "mx" equals "my" at step n19, the procedure proceeds to step n20 for convenience. The case wherein the procedure proceeds to step n21 results in that the lateral side margin x1 is calculated to be stored in the area M3 at step n22.

Subsequently, upon depression of a copying button at step n23, the copying machine begins copying at step n25 through step n24 whereat the transfer paper sheets are supplied after the starting timing therefor is advanced by the calculation described hereinbefore from the value "x" stored in the area M3 in RAM 13.

In the functions as the copying machine as described so far, steps n8 and n16 correspond to the calculating means for calculating the transfer available range according to the present invention.

It is to be noted that it is possible to calculate the ratios of the original sheet to the transfer available range in both the lateral and the crosswise sides lengths to make the smaller value the conversion magnification by inputting the margin defining values in both sides, when defining the margin ranges.

It is further to be noted that the margin defining index can be formed of light transmitting material, on the upper surface of which scales for index are inscribed, along with a cursor adapted to be movable at the side portion of the original sheet platform.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A variable magnification copying machine including means for detecting or inputting original sheet size, means for detecting or inputting transfer paper sheet size, and calculating means for calculating a conversion magnification from the sizes of the original sheet and the transfer paper sheet detected or inputted, wherein the improvement comprises:

input means for inputting margin defining ranges to be formed in the transfer paper sheet; and calculating means for calculating a transfer available range to the transfer paper sheet from numerical values inputted by said margin input means, whereby a conversion magnification is calculated by inputting said calculation result into said conversion magnification calculating means as a transfer paper sheet size, and whereby a starting timing for supplying the transfer paper sheets is controlled in compliance with margin defining values in a lateral direction.

* * * * *